United States Patent [19]
Evans et al.

[11] Patent Number: 6,082,792
[45] Date of Patent: Jul. 4, 2000

[54] VEHICLE BUMPER

[75] Inventors: Darin Arnold Evans, Walled Lake; Venkataraman Nagaswamy, Farmington, both of Mich.

[73] Assignee: General Electric Company, Schenectady, N.Y.

[21] Appl. No.: 09/074,276

[22] Filed: May 7, 1998

[51] Int. Cl.[7] .................................................. B60R 21/04
[52] U.S. Cl. ......................... 293/133; 293/120; 296/189
[58] Field of Search .................................... 293/132, 133, 293/120; 296/188, 189, 146.6; 280/751

[56] References Cited

U.S. PATENT DOCUMENTS

| | | | |
|---|---|---|---|
| 3,506,295 | 4/1970 | Yancey | 293/133 |
| 3,831,997 | 8/1974 | Myers | 296/133 X |
| 3,866,963 | 2/1975 | Weller . | |
| 3,930,665 | 1/1976 | Ikawa | 293/133 X |
| 4,208,069 | 6/1980 | Huber et al. . | |
| 4,227,593 | 10/1980 | Bricmont et al. | 293/133 X |
| 4,385,779 | 5/1983 | Kimura et al. . | |
| 4,386,799 | 6/1983 | Molnar | 293/120 |
| 4,413,856 | 11/1983 | McMahan et al. . | |
| 4,533,166 | 8/1985 | Stokes . | |
| 4,542,925 | 9/1985 | Huber et al. | 293/120 |
| 4,652,032 | 3/1987 | Smith | 293/133 X |
| 4,671,550 | 6/1987 | Molnar . | |
| 4,762,352 | 8/1988 | Enomoto . | |
| 4,925,224 | 5/1990 | Smiszek . | |
| 4,941,701 | 7/1990 | Loren . | |
| 5,033,593 | 7/1991 | Kazuhito | 293/133 X |
| 5,154,462 | 10/1992 | Carpenter . | |
| 5,290,078 | 3/1994 | Bayer et al. | 293/120 |
| 5,393,111 | 2/1995 | Eipper et al. . | |
| 5,435,619 | 7/1995 | Nakae et al. | 296/189 |
| 5,498,045 | 3/1996 | Morgan et al. . | |
| 5,711,562 | 1/1998 | Terada et al. . | |

FOREIGN PATENT DOCUMENTS

| | | |
|---|---|---|
| 2 364 789 | 4/1978 | France . |
| 2 762 563 | 10/1998 | France . |
| 30 20 997 | 2/1982 | Germany . |
| 6-144133 | 5/1994 | Japan . |

*Primary Examiner*—Joseph D. Pape

[57] ABSTRACT

An energy absorbing bumper assembly for a vehicle comprises an elongated energy absorber comprising forwardly projecting corrugated members and an adjacent members which extend in a longitudinally direction with a plurality of ribs extending in a direction transverse to the longitudinal direction for joining the corrugated member to the adjacent member comprised of an elastomeric material whereby said longitudinal members create hollow sections which are adapted for controlled collapse upon impact for absorbing energy. The plurality of ribs are additionally adapted for controlling the collapse of said hollow sections and stretch upon impact for additional energy absorption.

3 Claims, 4 Drawing Sheets

VEHICLE BUMPER

FIELD OF INVENTION

This invention relates to energy absorbing vehicle bumper systems.

BACKGROUND OF THE INVENTION

Bumpers typically extend widthwise across the front and rear of a vehicle and are mounted to rails which extend in a lengthwise direction. Desirable bumper energy absorbing systems minimize vehicle damage by managing the impact energy of a collision with a minimal amount of intrusion while not exceeding the rail load limit of the vehicle. The ideal energy absorber achieves high efficiency by building load quickly to just under the rail load limit and maintains that load constant until the impact energy has been dissipated.

A foam type bumper is described in U.S. Pat. No. 4,762,352 to Kaisha. A backup beam is connected to a pair of rails. A foam type resin of polypropylene, polyurethane or the like is positioned between the backup beam and an outer fascia.

Another system of the foam type is described in U.S. Pat. No. 4,941,701 to Loren. As set forth, a semi-rigid resilient fascia is spaced forwardly of the bumper structure, and the volume defined therebetween is filled with an integral skin urethane foam that is resiliently deformable and integrally bonded to both members.

Disadvantages of foam type systems include slow loading upon impact which results in a high displacement. Typically, foams are effective to a sixty to seventy percent compression. Beyond this point, foams become incompressible so that the impact energy is not fully absorbed. The remaining impact energy is absorbed through deformation of the backup beam and/or vehicle structure. Foams are also temperature sensitive so that displacement and impact absorption behavior can change substantially with temperature. Typically, as temperature is lowered, foam becomes more rigid resulting in higher loads. Conversely, as temperature rises, foams become more compliant resulting in higher displacements and possible vehicle damage.

U.S. Pat. No. 4,533,166 to Stokes describes non-foam energy absorbing system using a channel section shaped inner beam positioned inside a contoured outer beam having a channel shape cross section. The outer beam has transverse ribs stiffening the vertical portion with longitudinal stiffeners running between the ribs. The inner beam has transverse interbeam support sections molded in the exterior sides of the beam. Interbeam supports are positioned longitudinally displaced from the bumper supports to affixes the outer beam member to the inner beam member in spaced apart relationship. The double beam bumper is designed to be relatively insensitive to the location of the point of impact as far as energy absorption and impact forces are concerned with the purpose of eliminating bumper shock absorbers. The system requires separately molded outer beam and inner beam members having a particular shape.

The present invention is directed to an energy absorbing system of the non-foam type which is designed to achieve fast loading and efficient energy absorption upon impact. Impact forces during low speed impacts are maintained just below a predetermined level by deforming the energy absorber until the kinetic energy of the impact event has been absorbed. Once the impact is over, the absorber returns substantially to its original shape and retains sufficient integrity to withstand subsequent impacts.

SUMMARY OF THE INVENTION

The energy absorbing system of the present invention has a configuration which promotes superior energy absorption efficiency and with faster loading. The configuration permits the system to be packaged into a relatively small space compared to conventional foam systems. This gives automotive designers the freedom to style bumper systems with reduced overhang while enhancing the impact performance of the system. Enhanced bumper impact performance translates to reduced costs of repair for low speed "fender-benders" and greater occupant safety during higher speed collisions. Since the primary absorbing system can be achieved with a unitary and integrally molded thermoplastic engineering resin, the primary energy absorbing system can be easily recycled. Since foam is not utilized, greater consistency of impact performance may be achieved over varied temperatures. Another desirable characteristic of the invention is a smooth, predictable, loading response, which is insensitive to loading direction. This is especially important for front EA applications where consistent bumper system response is important to crash severity sensors.

In accordance with the present invention, there is provided an energy absorbing bumper assembly for a vehicle comprising an elongated energy absorbing means adapted for attachment to said vehicle. A preferred mounting is to an inner beam which in turn is mounted to rails or structure of the vehicle. It is also contemplated that the energy absorbing means may also be attached to and shipped with the fascia. The elongated energy absorbing means comprising a corrugated member and an adjacent member, which also may be corrugated. Each of the members project forwardly and extend in a longitudinally direction. A plurality of ribs extend in a direction transverse to the longitudinal direction for joining the corrugated member to the adjacent member. The energy absorbing means comprising an elastomeric or material of sufficient flexibility whereby said ribs and longitudinal members deform and progressively collapse upon impact for absorbing the energy of impact.

Also, in accordance with the present invention, the energy absorber is provided as a unitary and integral molded thermoplastic part which is adapted for attachment.

DETAILED DESCRIPTION OF PREFERRED EMBODIMENTS

Figure 1:
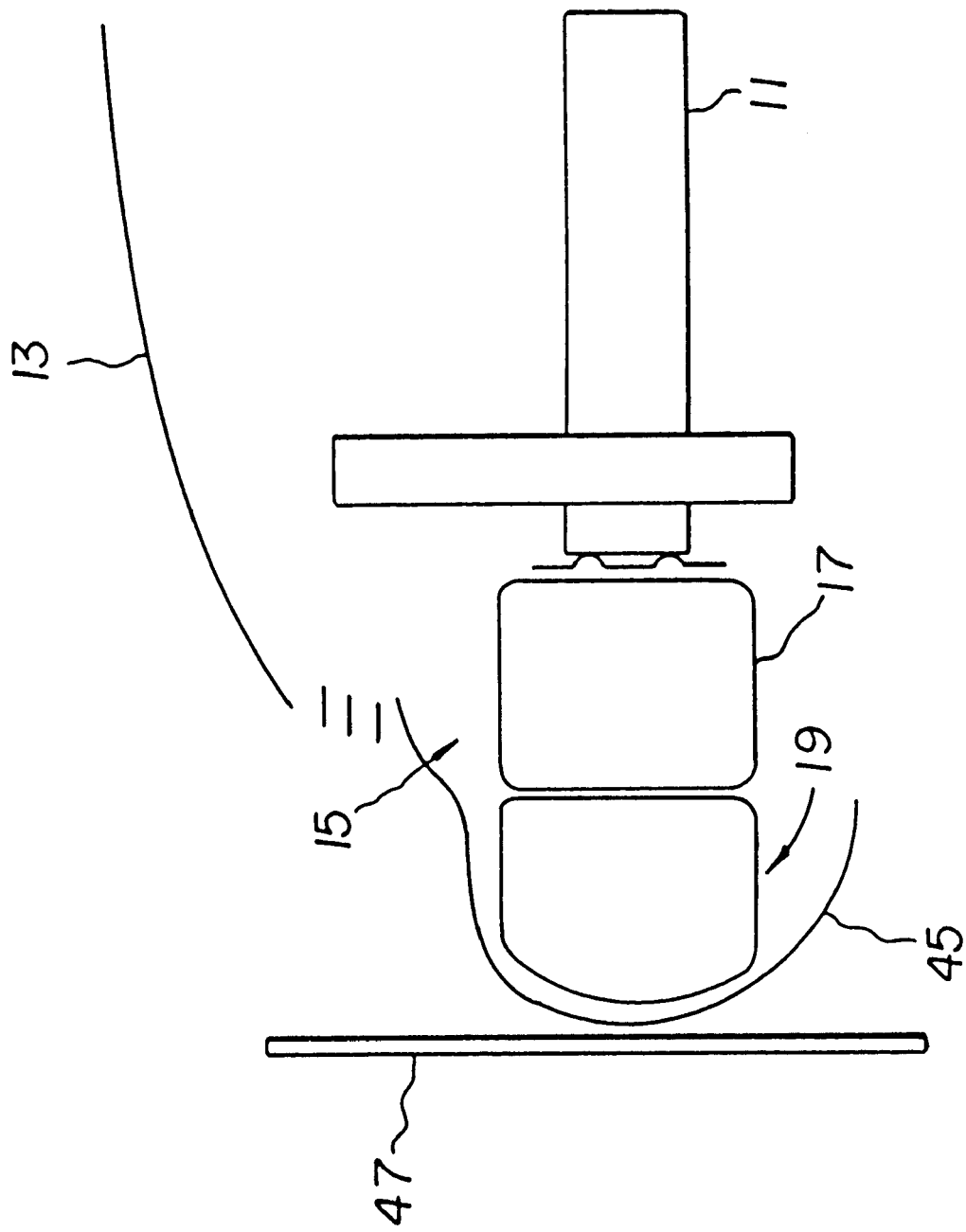
FIG. 1 is a schematic drawing showing the energy absorber in relationship to the vehicle.

FIG. 1 is a schematic representation of the system showing lengthwise extending frame rails 11 of the vehicle 13 which project outwardly for attachment of an energy absorbing bumper system 15. The support means or inner beam 17 is attached to the respective rails 11 and extends widthwise across the front of the vehicle 13. The inner beam 17 may be of steel, aluminum or composite construction. It is also contemplated that the support beam may be formed of a thermoplastic resin in the form of composite molded beam.

The bumper assembly 15 includes an elongated energy absorbing means 19 adjacent and affixed to the inner beam 17 and facing outwardly or exteriorly for absorbing energy upon impact. The inner beam 17 is typically fixedly attached to the rails 11 with bolts and nuts (not shown) with the energy absorbing means 19 in turn fixedly attached to the inner beam 17. The elongated energy absorbing means or energy absorber 19 has an inwardly facing portion which may be fixedly attached to the inner beam 17. The present invention should not be limited by the means of attachment since various attachment means are contemplated.

The energy absorber 19 includes an upper corrugated member 21 and inwardly spaced upper adjacent member 23. The upper corrugated member 21 and the upper adjacent member 23 project forwardly and away from the inner beam 17 in spaced apart and in a substantially parallel relationship. A plurality of upper ribs 25 join the upper corrugated member 21 to the upper adjacent member 23. The upper corrugated member 21 and the upper adjacent member 23 extend widthwise across the front of the vehicle along the longitudinal direction of the absorber 19. The plurality of upper ribs 25 extend transverse to the longitudinal direction and join the forward end portions of the upper corrugated member 21 and the adjacent member 23 so as to form an upper hollow section 27.

Figure 4:
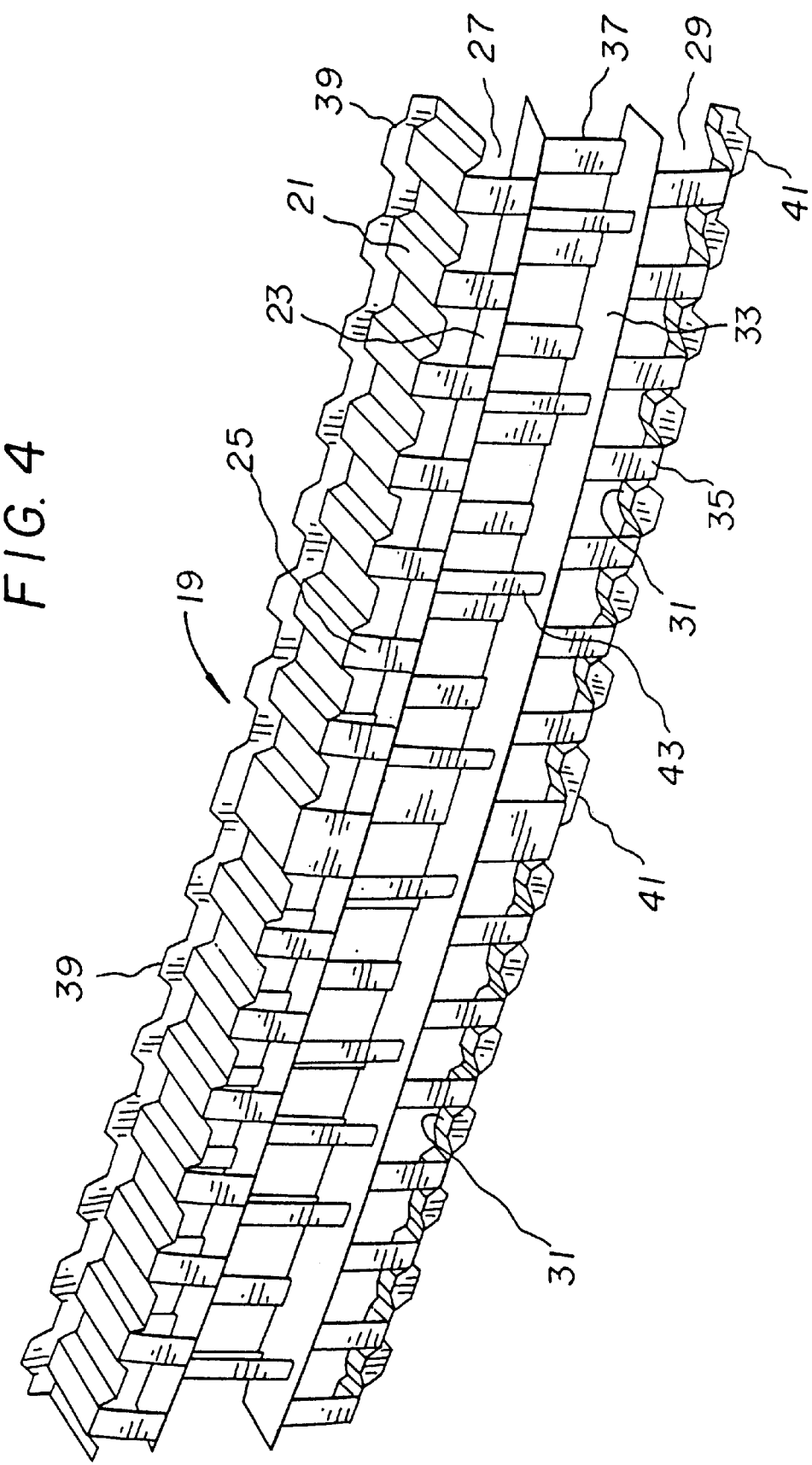
FIG. 4 is a perspective view showing the unitary energy absorber.

As illustrated in FIG. 4, the upper corrugated member 21 comprises an undulating surface with upper and lower spaced apart horizontal surfaces joined by upwardly extending walls. Each of the upper ribs 25 are preferably joined to the upper surface at one end and to the adjacent member 23 at the other end.

The terms inwardly and outwardly describe an inward direction and outward direction with respect to the interior of the bumper assembly and exterior of the assembly. With respect to the bumper assembly, the longitudinal direction is along the length thereof with the widthwise direction being transverse thereto. The terms upper and lower, vertical and horizontal are meant to indicate the position of relative features of the present invention and not as a limitation.

The corrugations are provided for imparting an added degree of stiffness to the corrugated member so as to resist deflection upon impact. Upon impact the corrugated member 21 tends to curl whereupon ribs 25 tend to stretch and act as further restraint against separation of the corrugated and adjacent members. The upper corrugated member 21 and the upper adjacent member 23 may curl and crush upon impact. To control deflection upon impact, the upper adjacent member 23 curls in a similar fashion to the corrugated member but in the opposite direction resulting in longitudinally continuous crush box 27. As the longitudinal member deforms during impact, tensile stresses develop in the ribs 25, resulting in stretching of the ribs. It is also contemplated that the upper corrugated member 21 may have greater stiffness than the adjacent member 23 so that greater load is distributed to the horizontal shelf 18 of the inner beam 17. In this manner, loads are preferentially distributed to the strongest portion of the inner beam rather than the unsupported mid-section. This results in reduced damage to the beam when compared to foam systems where preferential loading is not possible.

The absorber 19 includes a lower hollow section 29 of similar construction to the upper hollow section 27 which is spaced therefrom and extends in substantially parallel relationship thereto. The lower hollow section 29 includes a lower corrugated member 31 projecting forwardly in substantially parallel spaced apart relationship with a lower adjacent member 33. A plurality of lower ribs 35 join the lower corrugated member 31 to the lower adjacent member 33. The lower corrugated member 31 and the adjacent lower member 33 extend along a longitudinal direction of the hollow section 29 and widthwise across an end of the vehicle 13. A plurality of lower ribs 35 extend transverse to the longitudinal direction and join the forward end portions of the lower corrugated member 31 and the lower adjacent member 33 so as to form the lower hollow section 27.

Figure 3:
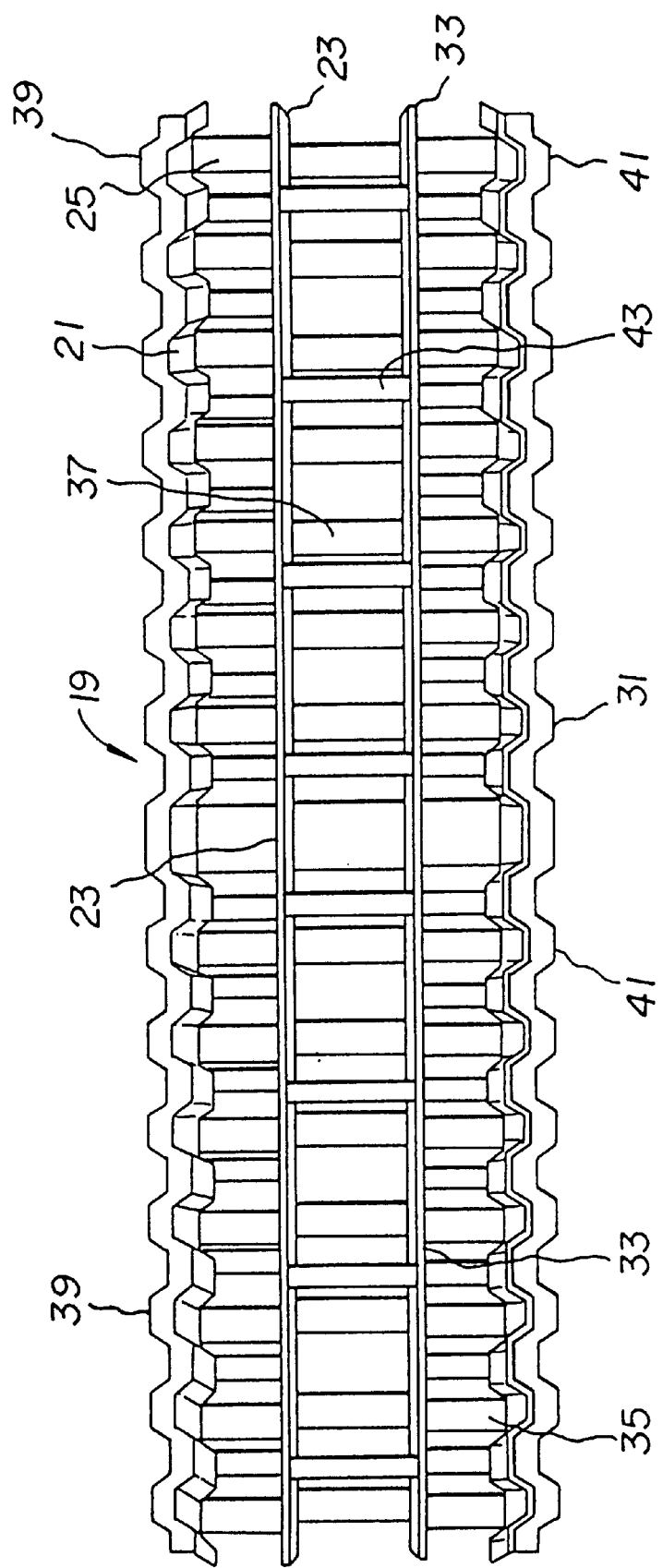
FIG. 3 is front view of the energy absorber.

As illustrated in FIG. 3, a plurality of additional ribs 43 join the upper hollow section 27 to the lower hollow section 29. As illustrated in FIG. 4, the additional ribs 43 tend to stretch so as to resist the tendency of the upper and lower hollow sections, 27 and 29, to move away from each other during impact. As illustrated in FIG. 3, the additional ribs 43 extend in a direction transverse to the longitudinal direction of the absorber 19 and are joined at one end to the upper adjacent member 23 and at the other end to the lower adjacent member 33 at a location just inside the front edges of these respective members 23 and 33. The additional ribs 43 are spaced in a longitudinal direction intermediate the respective upper and lower ribs, 25 and 35. As a result, energy from impact has a tendency to be spread out evenly across the absorber 19. The preferred mode for absorbing energy due to impact is where forwardly facing members 21, 23, 33 and 31 tend to crush and curl while the ribs 37, 43, tend to stretch.

Figure 2:
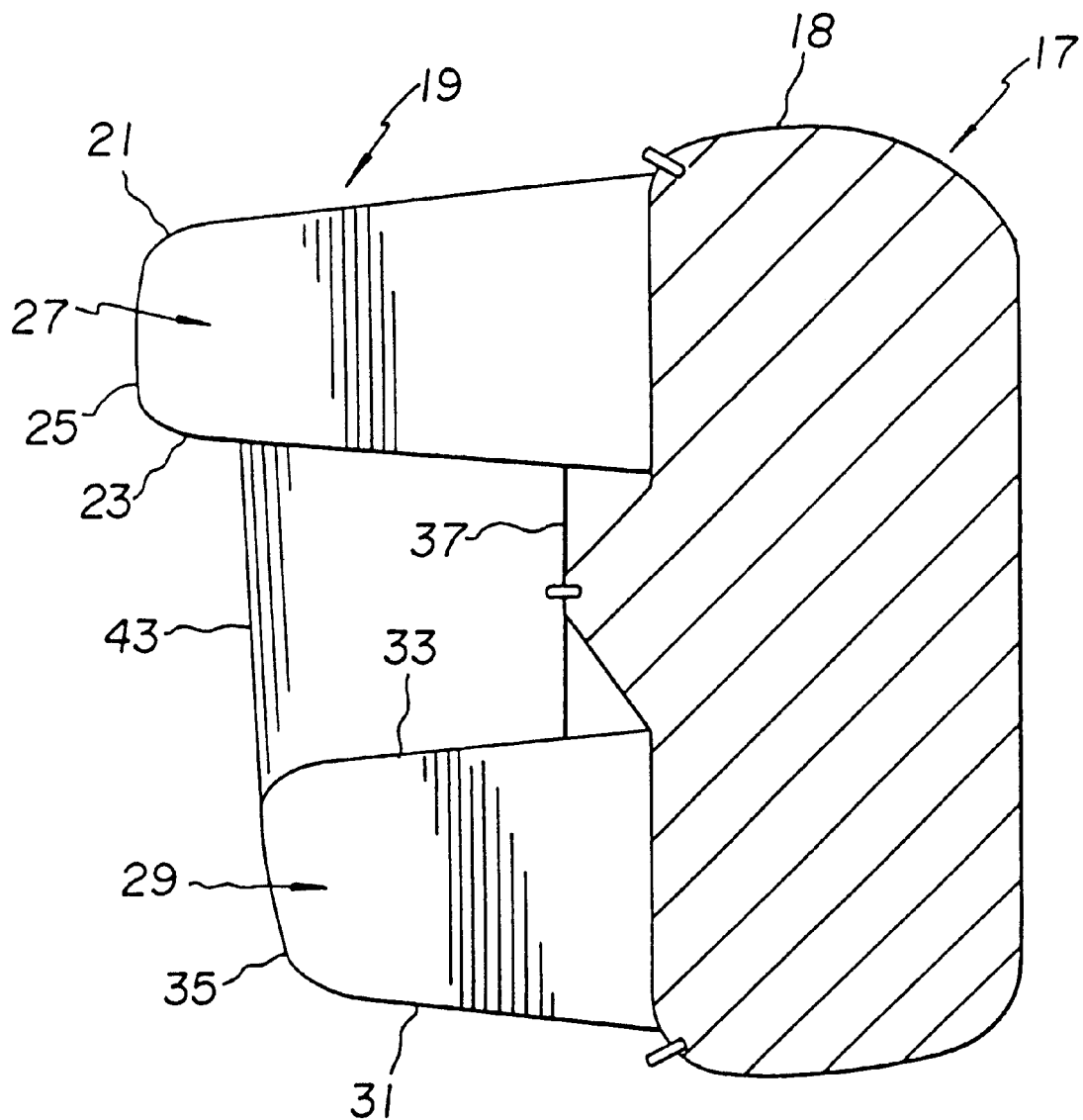
FIG. 2 is a cross sectional view of the energy absorber as mounted to a an inner bumper reinforcement.

The upper and lower hollow sections, 27 and 29, are joined by an inner flange 37 which joins and extends between respective interior end portions of the respective upper and lower adjacent members, 23 and 33, respectively. The inner flange 37 is fixedly attached to the inner beam 17, by fasteners in the form of molded-in snap fits, self-tapping screws or other means as illustrated in FIG. 2. The inner flange 37 may comprise a ribs which join the upper adjacent member 23 to the lower adjacent member 33. The upper and lower corrugated members, 21 and 31, respectively, include respective outer flanges, 39 and 41, to provide for fixed attachment to the inner beam 17. It is contemplated that other means for fixed attachment may be utilized.

As illustrated in FIG. 3 and FIG. 4, the absorber 19 is shown as a unitary and integral part. The absorber 19 is preferable formed from an engineering thermoplastic resin having desirable properties by an injection molding process. In an alternative embodiment a structure similar to the one described may be achieved via a blow molded process. This configuration may be developed through a multiple hollow sections with corrugated and adjacent longitudinal members which may be broken into pods across the front of the absorber 19. The injection molded configuration consists of a staggered "W" section with reinforcing corrugations and ribs. The configuration is of a preferred one piece construction.

It is contemplated that blow molding, thermoforming, compression molding and rim processes may also be used.

The preferred characteristics of the material of construction include high toughness/ductility, thermally stable, high energy absorption capacity, good modulus-to-elongation ratio, recyclable.

In more detail, the preferred one piece construction includes a pair of adjacent members, 23 and 33, projecting forwardly in spaced apart relationship and inwardly of respective upper and lower corrugated members 21 and 31. These members 23, 33, 21, and 31 are all in substantially parallel relationship with each other in horizontal alignment. Each of the upper and lower corrugated members, 21 and 31, and the upper and lower adjacent members have respective forward and rearward end portions. A plurality of ribs 25 and 35 join the members as previously discussed. The upper and lower sections, 27 and 29, and the respective corrugated members 21 and 31, are positioned so as to tend to an outward direction away from each other so as to collapse inwardly and stretch the ribs upon impact for absorbing energy.

For esthetic reasons, it is preferable to have the exterior of the bumper 15 enclosed with a fascia 45. The fascia may attached to the absorber 19, directly to the inner beam 17, or to the body sheet-metal.

The energy absorbing member including the upper and lower section are preferably of unitary construction from a tough plastic material. Preferred materials are engineering thermoplastic resins. Typical engineering thermoplastic resins include acrylonitrile-butadiene-styrene (ABS), polycarbonate, polycarbonate/ABS blend, a copolycarbonate-polyester, acrylic-styrene-acrylonitrile (ASA), acrylonitrile-(ethylene-polypropylene diamine modified)-styrene (AES), phenylene ether resins, blends of polyphenylene ether/polyamide (NORYL GTX® from General Electric Company), blends of polycarbonate/polybutylene terephthalate and impact modifier (XENOY® resin from General Electric Company) blends of polycarbonate/PET/PBT, polyamides, phenylene sulfide resins, ), poly(vinyl chloride) PVC, and High-impact Polystyrene (HIPS).

What is claimed is:

1. A unitary elongated energy absorbing means adapted for attachment to a vehicle said unitary elongated energy absorbing means comprised of a first corrugated member and a first adjacent member and a second corrugated member and a second adjacent member, each of said members projecting forwardly and extending in a longitudinal direction across the width of a vehicle, a plurality of ribs extending in a direction transverse to said longitudinal direction joining said first corrugated member to said first adjacent member, said second corrugated member to said second adjacent member and said first adjacent member to said second adjacent member, said plurality of ribs comprising an elastomeric material whereby said ribs stretch upon impact for absorbing energy.

2. An energy absorbing bumper assembly which extends longitudinally across the width of a vehicle comprising a support means adapted for attachment to a vehicle, an elongated energy absorbing means adjacent said support means for absorbing energy upon impact, said elongated energy absorbing means comprising a first corrugated member and an first adjacent member and a second corrugated member and a second adjacent member, each of said members projecting forwardly and extending in a longitudinal direction across the width of a vehicle, a plurality of ribs extending in a direction transverse to said longitudinal direction joining said first corrugated member to said first longitudinally member said second corrugated member to said second longitudinal member and said first adjacent surface to said second adjacent surface, said plurality of ribs comprising an elastomeric material whereby said ribs stretch upon impact for absorbing energy.

3. An energy absorbing bumper assembly which extends longitudinally across the width of a vehicle comprising a longitudinally extending support means adapted for attachment to a vehicle, an elongated energy absorbing means for absorbing energy upon impact which is adjacent said support means said elongated energy absorbing means comprising an upper corrugated member and a lower corrugated member, said upper and lower corrugated members projecting forwardly in substantially parallel spaced apart relationship, a first adjacent member and a second adjacent member, each of said adjacent members projecting forwardly in spaced apart relationship inwardly of said respective upper and lower corrugated members and substantially in parallel relationship thereto, each of said upper and lower corrugated members and said first and second adjacent members having respective forward and rearward end portions, a plurality of ribs joining said forward portion of said upper corrugated member to a forward portion of said first adjacent member and joining a forward portion of said lower corrugated member to said forward portion of said second adjacent member to form two spaced apart hollow sections, said hollow sections comprising a first upper hollow section being formed by said upper corrugated member being joined to said first adjacent forwardly projecting member by a plurality of ribs, and a second lower hollow section being formed by said lower corrugated member being joined to said second adjacent forwardly projecting member by a plurality of ribs, a flange member extending between respective interior end portions of said first and second adjacent forwardly projecting members, said flange member being attached to said longitudinally extending support means, said respective upper and lower corrugated members having interior end portions attached to said longitudinally extending support means, said upper and lower corrugated members having an exteriorly facing concavity whereby said corrugated members buckle in an outward direction and stretch said ribs upon impact for absorbing energy.

\* \* \* \* \*